United States Patent [19]

Schreier

[11] Patent Number: 5,503,461
[45] Date of Patent: Apr. 2, 1996

[54] FIVE-POINT SAFETY SYSTEM FOR A SEAT

[75] Inventor: Frederick L. Schreier, Rochester Hills, Mich.

[73] Assignee: AlliedSignal Inc., Morristown, N.J.

[21] Appl. No.: 170,478

[22] Filed: Dec. 20, 1993

[51] Int. Cl.[6] ............................................. A44B 11/25
[52] U.S. Cl. .................................. 297/484; 297/467
[58] Field of Search ................................ 297/484, 238, 297/467, 464, 476, 487

[56] References Cited

U.S. PATENT DOCUMENTS

| | | | |
|---|---|---|---|
| 3,891,273 | 6/1975 | Takada | 297/388 |
| 4,025,111 | 5/1977 | Tanaka | 297/390 |
| 4,099,778 | 7/1978 | Werner | 297/386 |
| 4,342,483 | 8/1982 | Takada | 297/488 |
| 4,402,548 | 9/1983 | Mason | 297/464 |
| 4,429,916 | 2/1984 | Hyde et al. | 297/250 |
| 4,533,176 | 8/1985 | Wyttenbuch | 297/238 |
| 4,540,218 | 9/1985 | Thomas | 297/467 |
| 4,613,188 | 9/1986 | Tsuge et al. | 297/250 |
| 4,679,852 | 7/1987 | Anthony et al. | 297/464 |
| 4,720,148 | 1/1988 | Anthony et al. | 297/474 |
| 4,762,369 | 8/1988 | Nicod | 297/484 |
| 4,768,828 | 9/1988 | Kohetsu | 297/484 |
| 4,880,277 | 11/1989 | Takahashi et al. | 297/484 X |
| 5,026,115 | 6/1991 | Barnes | 297/219 |
| 5,098,161 | 3/1992 | Minami | 297/464 |
| 5,161,855 | 11/1992 | Harmon | 297/238 |
| 5,181,765 | 1/1993 | Glover | 297/467 |
| 5,286,084 | 2/1994 | Bart | 297/238 |

FOREIGN PATENT DOCUMENTS

| | | |
|---|---|---|
| 0295838 | 12/1988 | European Pat. Off. . |
| 295838 | 12/1988 | European Pat. Off. ............... 297/484 |
| 0597692 | 5/1994 | European Pat. Off. . |
| 2175194 | 11/1986 | United Kingdom . |

Primary Examiner—Laurie K. Cranmer
Attorney, Agent, or Firm—Markell Seitzman

[57] ABSTRACT

A five point restraint system having a harness for securing an occupant to an occupant seat including: a first and a second belt, each of the first and second belts including first and second ends, and a shield plate slidably receiving each of the first and the second belts, each of the first ends of the belts fixedly secured relative to the occupant seat, the shield plate including first and second openings through which the first and second belts are through threaded, the shield plate including first lock member for lockingly engaging with second lock member positioned on the seat, the shield plate and belts extendable over the occupant's head and shoulder and the belts engagable with the occupant's shoulders, the belt portions extending toward the first ends engagable against the outside of the lower torso of the seated occupant; a belt tightener for receiving the second ends of the belts permitting the extension and retraction of each belt, wherein upon engagement of the first lock means to the second lock member a five point restraint system is achieved such that the lower torso of the occupant extends between the shield plate and the belts, the shield between the legs and belts holding the shoulders.

11 Claims, 3 Drawing Sheets

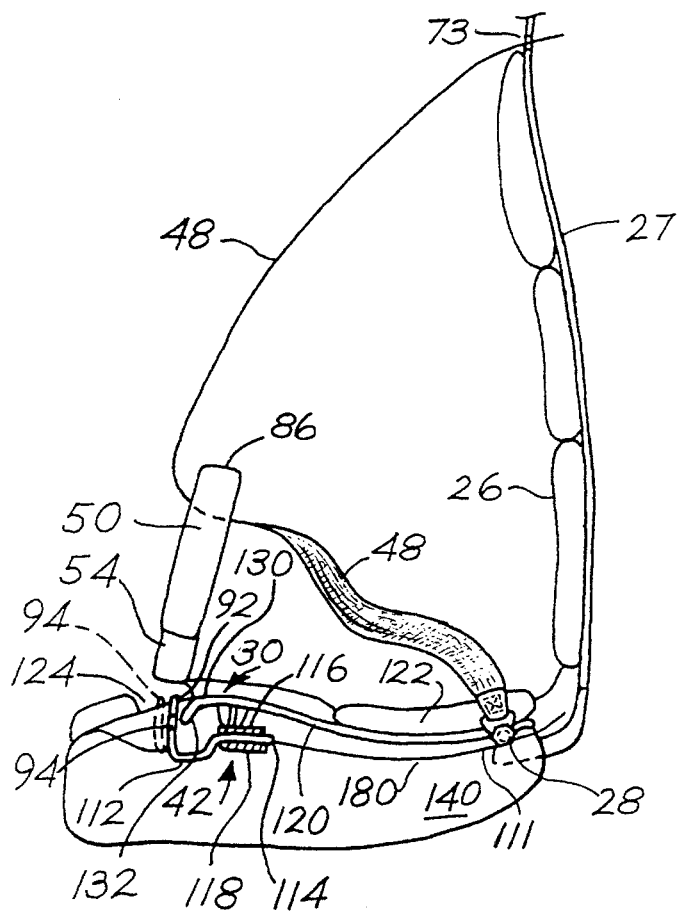

FIVE-POINT SAFETY SYSTEM FOR A SEAT

BACKGROUND AND SUMMARY OF THE INVENTION

The present invention relates generally to safety restraint systems and more particularly to a five-point safety restraint system suitable for use with safety seats and particular with an integrated or stand alone child seat.

There presently exist any number of restraint systems for child safety seats of the integrated or stand alone type. These systems operate adequately to protect the child but are rather complicated to use especially as an adult tries to place the restraint system about the child and simultaneously tries to hold the child securely in place on the seat. The purpose of the present invention is to provide a system in which an adult need only use one hand to secure a restraint system about a seated child. A further object of the present invention is to provide a system that safely secures a child to the seat. An additional object of the present invention is to provide a 5-point easy to use restraint system.

Accordingly, the present invention comprises: a five point restraint system comprising: a harness means for securing an occupant, such as a child, to an occupant seat comprising: a first and a second belt, each of the first and second belts including first and second ends, and a shield plate slidably receiving each of the first and the second belts, each of the first ends of the belts fixedly secured relative to the occupant seat defining a first and a second restraint point, the shield plate including first and second openings through which the first and second belts are through threaded, the shield plate includes first lock means for lockingly engaging with second lock means positioned on the seat defining a third restraint point, the shield plate and belts extendable over the occupant's head and shoulder and the belts engagable with the occupant's shoulders, the belt portions extending toward the first ends engagable against the outside of the lower torso of the seated occupant; belt tightening means for receiving the second ends of the belts, defining a fourth and a fifth restraints point, wherein upon engagement of the first lock means to the second lock means a five point restraint systems is achieved. As can be seen the child is restrained at five points, that is, the buckled shield provides a restraint in between the legs of the child, the belts extending over the childs lower torso or legs provide two other restraint points and the belts engaging the childs shoulder provide the last two restraint points.

Many other objects and purposes of the invention will be clear from the following detailed description of the drawings.

BRIEF DESCRIPTION OF THE DRAWINGS

In the drawings:

FIG. 2 shows a cross-sectional view of the seat showing many of the major components of the invention.

FIG. 3 shows a belt tightener.

DETAILED DESCRIPTION OF THE DRAWINGS

Figure 1:
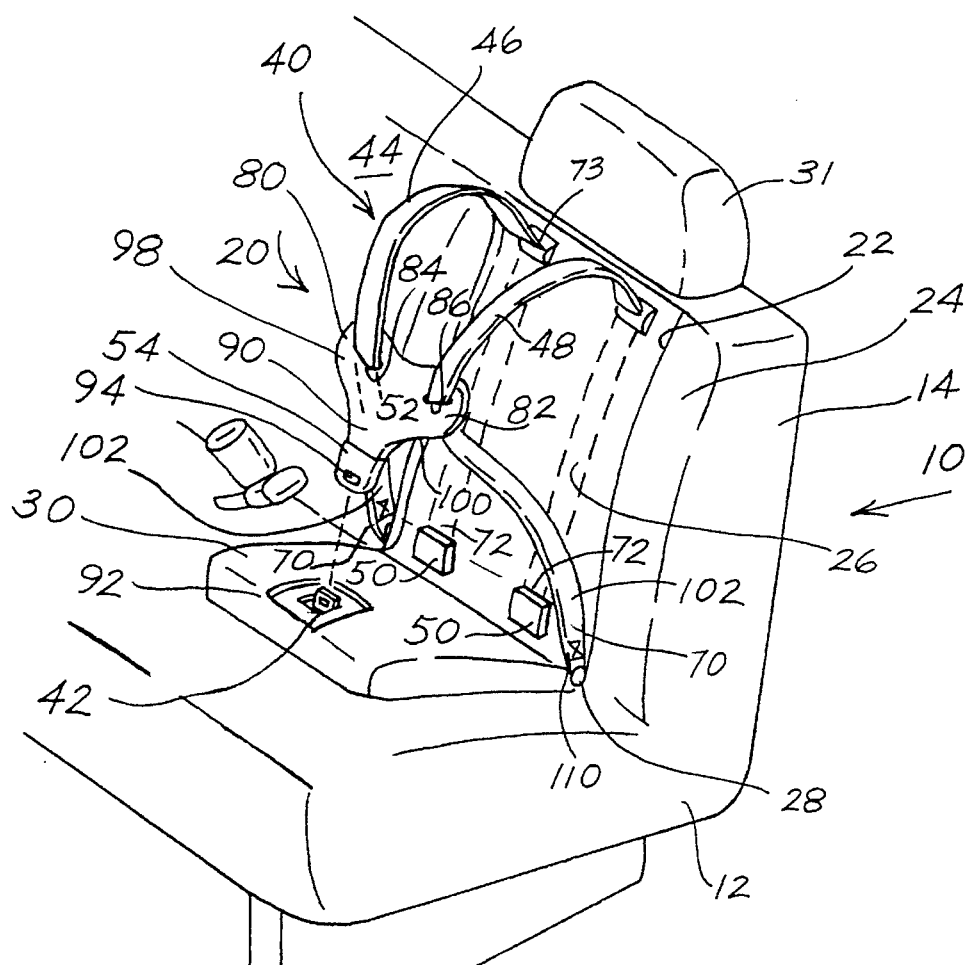
FIG. 1 shows an integrated child seat illustrating many of the features of the present invention.

Reference is made to FIG. 1 which illustrates a vehicle seat 10 having a seating surface or cushion 12 and back 14. Integrated within this seat 10 is a child safety seat generally shown as 20. The back 14 of seat 10 is provided with a recessed pocket 22. The rear of the pocket is padded at a rear or back surface 26 to support the child's back. Positioned toward the bottom of the back 14 of seat 10 and disposed within the pocket 22 are hinges or anchors points 28. Rotationally mounted upon the hinges 28 is a seat portion 30 of the child seat 20 defining a seating surface upon which the child may sit. When not in use the seat portion 30 is folded rearwardly and stowed within the pocket 22. A head rest 21 shown on the seat 10 is rotated down and with the seat portion closes the pocket 22. The rear of the head rest and bottom of the seat portion 30 provide a cushioned surface to support an occupants back when seated on the seating surface or cushion 12.

The child seat 20 additionally includes a five point pelvic restraint system 40 part of which is shown in FIG. 1. The system 40 includes a sliding tongue assembly 42, a harness assembly 44 comprising: webbing or belts 46 and 48, a belt tightener which may comprise at least one or more retractors 50, a shield 52, and buckle 54. The restraint system 40 may optionally include a cable and associated linkage assembly generally shown as 180, 190 and 202 which are used in some embodiments of the invention.

The 5-point restraint system achieved by the present invention secures the shield 52 about the child to five locations or points on the child seat 20, support structure or vehicle seat 10. The shield 52, in the embodiment illustrated in FIG. 1 is Y-shaped having extending arm portions 80 and 82. Located within the extending arm portions is a respective slot 84 and 86. The belt or webbing 46 or 48 is respectively received through one or the other of the openings 84 and 86. The lower end 90 of the shield 52 is fitted with the buckle 54 which engages a latch plate 92 of the sliding tongue assembly 42. The buckle/latch plate coupling defines one of the five restraint points. The buckle 54 is fitted with a release button 94 of known construction to permit decoupling from the latch plate 92.

A first end 70 of belt 46 is secured to one of the hinges 28. A second end 72 of the belt 46 is threaded through an opening 73 in the rear surface 26 and operatively connected to the belt tightener 50 which when locked. Similarly a first end 70 of belt 48 and second end 72 of belt 48 are respectively connected to the other hinge 28 and the belt tightener 50. Belt 48 is threaded through another opening 73 in the rear surface 26. When not in use the belt tightener 50 operates to remove any excess webbing and in doing so causes the belts 46 and 48 as well as the shield 52 to lie generally flat against the back surface 26 permitting unobstructed closure of the seat portion 30 and head rest 31.

To secure a child to the child seat 20, the head rest 31 is raised and the seat portion 30 lowered and the child positioned thereon. With the child in place, an adult need only use a single hand to grasp the shield 52 and lift and pull same above the child's head and then extend the shield forwardly over the child's head and shoulders. As the shield 52 is being moved webbing is protracted or released from the belt tightener. The webbing is permitted to slide through the openings 73 as the shield is moved. After a sufficient amount of webbing has been extended, the shield 50 is lowered and the buckle 54 secured to the latch plate 92. Thereafter, any excess webbing 46 and 48 is removed by operation of the belt tightener capturing the child about the shoulders and securing the upper torso against the back surface 26. Further, when the shield is secured in place the child's legs will extend outwardly relative to the sides 98 and 100 of the shield 52 with the shield between the child's legs. As can be appreciated a portion of the webbing 102 of each belt 46 and 48 envelopes the left and right outer portions of the child's lower torso and in combination with the shield provides an effective restraint for the child's lower torso.

Reference is made to FIG. 2 which illustrates a side cross-sectional view of the child seat 20 showing the padded back surface 26 which may cover a structural (metal) back support member 27, the seat portion 30, the shield 52, buckle 54 and one of the belts such as 48, extends through one of the openings 73. A metal fastener 110, having an opening 111 is secured at an end of belt 48 and to one of the hinges 28. A similar arrangement is provided for belt 46. Positioned within the seat portion 30 is the slide tongue assembly 42. The assembly 42 includes the sliding latch plate or tongue 92 which has a latch opening 94 to receive a locking part of the buckle 54 as is common to most seat belt buckles. The latch plate 92 is bent at its middle 112 and includes a distal end 114 extending rearwardly. The distal end 114 is slidably received within two spaced apart bars 116 and 118. As will be seen from the description below the latch plate 92 is moved rearwardly in repsonse to a spring force when the buckle is not mated thereon. The seat portion includes a rigid seat support member 120 covered by a cushion 122. The cushion 122 has an opening 124 to receive the buckle 54 permitting engagement with the latch plate or tongue 92. A part of the support member 120 or a separate part defines a positioning flange 130 behind the latch plate 92. The front end of the positioning flange 130 is bent downwardly to provide an engagement surface 132 against which the buckle 54 slides.

As the buckle is pushed into the opening 124 it engages a bracket flange at 134. With the tongue 92 within the buckle 54 and as the buckle is pushed further downwardly the flange forces the buckle and tongue forwardly causing the sliding latch plate or tongue 92 forwardly to the position shown, in phantom line, in FIG. 2, whereupon the latching mechanism (not shown) within the buckle engages the opening 94 in the tongue 92.

As can be appreciated FIG. 2 does not illustrate the details of the belt tightener. In the embodiments below, the belt tightener 50 is one or more retractors 150 or a friction latching mechanism with the belt pulled therethrough and latch by a locking part. As will be seen the retractor 150 may be positioned (see FIG. 2) within the seat portion 30 generally at location 140, near the top and behind the back surface 27 at location 142 or near the bottom and behind the back surface rear surface at location 144.

FIG. 3 shows the general configuration of a belt tightener 50 that may be used at each location 140, 142, and 144 with some variation to accommodate the difference positions. The belt tightener 50 comprises two retractors 150a and 150b of conventional design. Each retractor 150a, b includes a frame having frame sides 152a, 152b mounted to member 120 or member 27 and a spool or reel. 154. The frames of each retractor are mounted colinear with each other. Each spool 154 includes a pair of disks 156a and 156b to contain its belt 46 or 48. Disk 156b of retractor 150a contains teeth 158 about its periphery and disk 156a of retractor 150b also contains teeth 158. Return springs 160 are provided for each retractor 150a, b to retract the webbing or belt. Each spool 154 includes a shaft 162 rotationally supported in its frame sides 152. These shafts can be separate as illustrated or joined and movable together. In each embodiment of the invention the retractors 150 are maintained in a free-wheeling condition whenever the buckle 54 is not secured to the tongue 92. By free-wheeling it is meant that the rotation of the retractors is not restricted and webbing can be freely protracted or extracted. However, when the buckle is so secured, the retractors are locked in a webbing protraction direction but are rotatable in a webbing retraction direction. Rotationally supported in opposing frame parts is a locking pawl 170 which when moved into position engages and locks with the teeth 158 of each retractor. The pawl 170 is moved into and out of engagement with the teeth of the opposing retractor disks in correspondence with the motion of the sliding latch plate or tongue 92.

Figure 4:
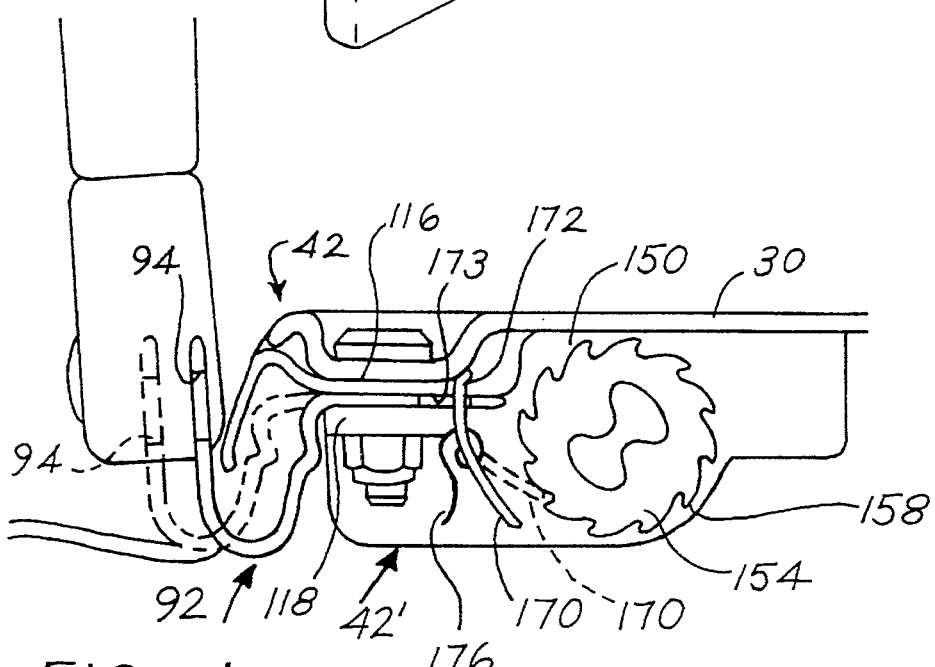
FIGS. 4-6 show alternate embodiments of the present invention.

FIG. 4 is a cross-sectional view of one of the retractors 150 positioned within the seat portion 30 directly behind a sliding tongue assembly 42'. This assembly is functionally the same as assembly 42 and differs mainly in how the latch plate is held. Coupled to the sliding tongue 92 is the rotationally mounted locking pawl 170. The pawl is movable from a disengaged position to an engaged position (shown in phantom line) where the pawl 170 engages one of the teeth 158 formed on a disk 154 of the retractor. In this embodiment an upwardly extending boss 172 of the pawl 170 is received within an opening 173 in the distal end of the tongue. As the sliding tongue is moved outwardly, upon insertion of the buckle 54, the boss 172 is moved to the left (as seen in FIG. 4) causing the pawl 170 to rotate into engagement the teeth 158. Under the bias force provided by a clockwise biased spring 176 the pawl 170 pushes the tongue 92 rearwardly.

Figure 5:
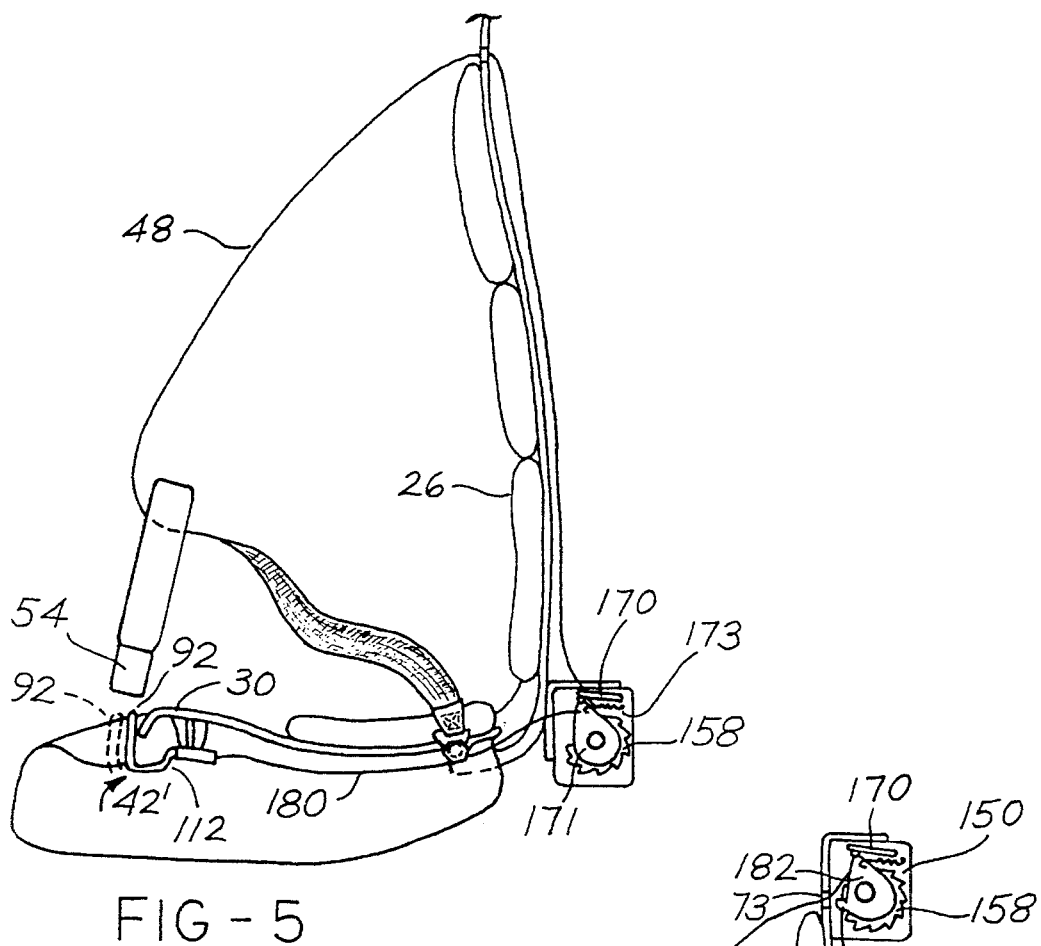

Reference is now made to FIG. 5, which shows the retractors 150 at location 144 remote from the sliding tongue assembly 42. In this embodiment a cable 180 joins the sliding tongue 92 to a cam 171, which as rotary mounted to the retractor(s). The operation of this system is essentially the same as that described upon with the exception that the pawl 170 is moved by the cam 171. The cable 180 links the plate 92 and cam 171. The pawl is moved by the cam 171 which is reversed biased by a spring 173.

Figure 6:
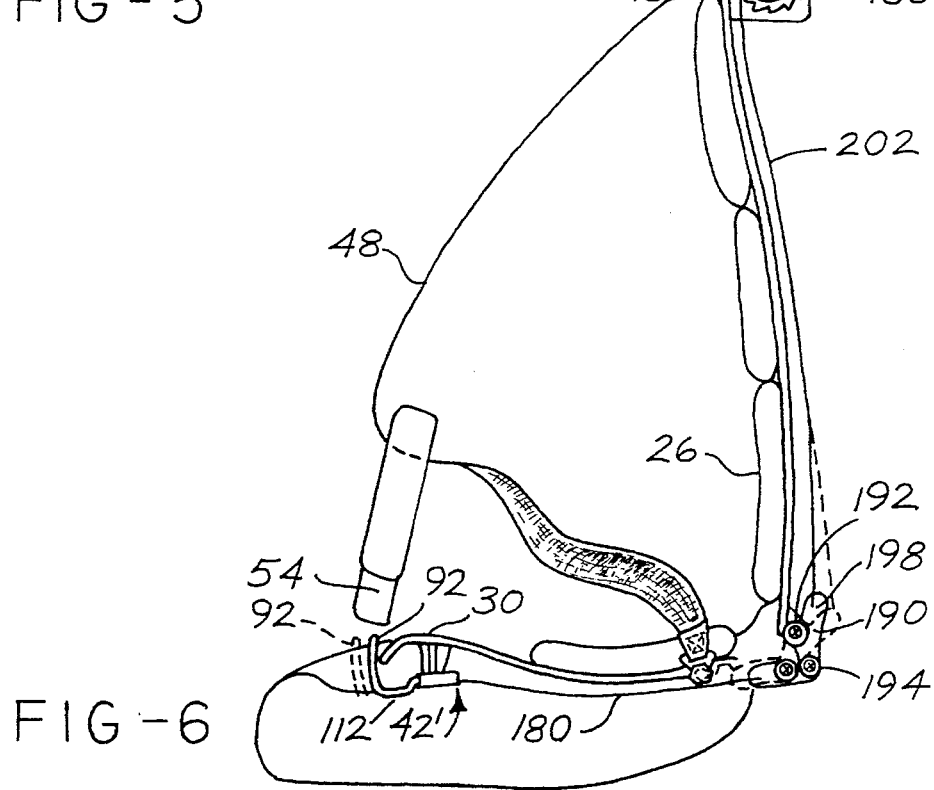

Reference is briefly made to FIG. 6 which illustrates the positioning of the retractors 150 at location 142. The tongue 92 is shown in its retracted position prior to receiving the buckle 54. As mentioned above, the tongue will move outwardly as the buckle is latch to the slide plate. Positioned at the rear of the back 26, is a link 190, which pivots about a bar or pin 192. One end 194 of the link 190 is secured to one end of a cable 180. The other end of the cable is secured to the slide tongue 92. The other end 198 of the linkage 190 is secured to a second cable 202. The other end of this cable is secured to a cam 171 which is biased by spring 173.

When the buckle 54 is not secured to the tongue 92, the spring 173 rotates the cam 171 clock-wise and pulls cable 202 upwardly, causing the link 190 to achieve a positioned as shown in FIG. 6. In this position, the end 194 is rotated outwardly which in turn applies a tensile force to cable 180 causing the slide tongue to reside in its retracted position. In addition, in this position, the cam 171 biases the pawl 170 out of engagement with the disk or ratchet teeth 158 to permit the retractor to freely rotate. Upon insertion of the buckle, upon the tongue 92, the tongue slides forward causing link 190 to rotate in a clockwise position (as shown in phantom line). The rotation of the link 190 pulls the cable 202 down, which in turn, pulls the cam 171 downwardly and permits the pawl 170 to rotate or drop into its engaged position with one of the teeth 158 formed on one or both disks or rachet wheels 156. With the pawl in engagement with the teeth further protraction of the webbing is prohibited, however, the individual teeth 158 can rachet upon the pawl 170 permitting excess webbing to be retracted upon the spool(s) of the retractor(s).

Many changes and modifications in the above described embodiment of the invention can, of course, be carried out without departing from the scope thereof. Accordingly, that scope is intended to be limited only by the scope of the appended claims.

I claim:

1. A five point restraint system comprising:

a harness means for securing an occupant to an occupant seat comprising: a first and a second belt, each of the first and second belts includes first and second ends, a shield plate including first means for slidably receiving each of the first and the second belts, each of the first ends of the belts fixedly secured relative to the occupant seat, the shield plate further includes first lock means for lockingly engaging with second lock means positioned on the seat, the shield plate and belts simultaneously extendable when the shield plate is manually moved;

belt tightening means operatively connected to the second ends of the belts, permitting extension and retraction of each belt, wherein upon engagement of the first lock means to the second lock means a five point restraint system is achieved.

2. The device as defined in claim 1 wherein the belt tightening means includes retractor means for protracting and retracting the belts including a ratchet or toothed wheel and locking means movable between an engaged position relative to the ratchet wheel in which the belts are prevented from being protracted while permitting the ratchet wheel to rotate to retract the belts and a disengaged position in which the retractor is free wheeling to protract and retract the belts.

3. The device as defined in claim 2 wherein the first lock means includes a latching buckle at a lower portion of the shield plate, and wherein the second lock means includes a tongue positioned within and extending outwardly relative to the seat, the tongue including support means for permitting the tongue to slide forward relative to the seat as the buckle is inserted thereupon;

first means for biasing the tongue rearwardly; the motion of the tongue initiating movement of the locking means to its engaged position.

4. The device as defined in claim 3 wherein the retractor means and the tongue are remotely positioned and wherein the locking means is operatively joined to the tongue by at least one cable.

5. The device as defined in claim 3 including a rotatable link mounted proximate the junction of a first seating and a first back surface including first and second link ends;

a first cable interconnecting the tongue to a first link end of the link, the first cable being located beneath the first seating surface, a second cable interconnecting a second link end to the locking means of the retractor means.

6. The device as defined in claim 3 wherein the first end of each belts is fixedly connected to an anchor point.

7. The device as defined in claim 1 wherein the occupant seat is integrated into a standard automotive seat having a second back surface and a second seating surface, wherein the occupant seat back surface is formed in a part of the second seat back and includes a hinge and wherein the first seating surface is hingedly connected about the hinge to the automotive seat and movable between a stored position in the recess of the automotive seat and a operative position resting upon the second seating surface.

8. The device as defined in claim 1 wherein the belt tightening means comprise retractor means including a first and a second spool each receiving respective second ends of the belts.

9. The device as defined in claim 8 wherein each retractor includes a ratchet wheel and a locking means for locking the ratchet wheel.

10. The device as defined in claim 1 wherein the first means includes first and second openings through which the first and second belts are through threaded.

11. A five point restraint system for securing an occupant to a seat, the seat including a seat seating surface, and a back surface having two belt receiving openings, comprising:

first and second safety belts a portion of which can be secured over a child's shoulders, each belt having a first and a second end, the first end of each belt adapted to be secured to the seat and the second end of the belt threaded through a the belt receiving opening in the back surface, the belts providing four of the five restraint points;

retractor means for receiving the second ends of the belts permitting the protraction and retraction of each safety belt, the retractor means including locking means movable between an engaged position in which the safety belts are prevented from being protracted and a disengaged position in which the safety belts are permitted to protract and retract;

a shield plate adapted to be moved over the occupant's head to a latching position with the belts movable therethrough, including a latching buckle at a lower portion thereof engagable with a sliding tongue positioned within the seat to provide the fifth restraint point, a portion of the tongue extending up through the latch opening; the shield plate further including first and second apertures for slidably receiving the first and second safety belts the belts sliding therethrough as the shield is positioned about the occupant;

the tongue arranged to slide forwardly relative to the seating surface as the buckle is latched thereto, a spring for biasing the tongue rearwardly;

a movable link mounted proximate the junction of the seating and back surfaces including first and second link ends;

a first cable interconnecting the tongue to the first link end, the first cable being located beneath the seat surface, a second cable interconnecting the second link end to the locking means of the retractor such that when the tongue is moved forwardly the cables and link are also moved thereby moving the locking means to the engaged position.

* * * * *